United States Patent
Kobayashi et al.

(10) Patent No.: US 11,364,871 B2
(45) Date of Patent: Jun. 21, 2022

(54) SIDE AIRBAG APPARATUS

(71) Applicant: Autoliv Development AB, Vargarda (SE)

(72) Inventors: Yuto Kobayashi, Kanagawa (JP); Tsutomu Sakurai, Kanagawa (JP)

(73) Assignee: Autoliv Development AB, Vargarda (SE)

(*) Notice: Subject to any disclaimer, the term of this patent is extended or adjusted under 35 U.S.C. 154(b) by 0 days.

(21) Appl. No.: 17/120,575

(22) Filed: Dec. 14, 2020

(65) Prior Publication Data
US 2021/0188208 A1 Jun. 24, 2021

(30) Foreign Application Priority Data

Dec. 20, 2019 (JP) .............................. JP2019-230223
Oct. 13, 2020 (JP) .............................. JP2020-172524

(51) Int. Cl.
| | |
|---|---|
| *B60R 21/231* | (2011.01) |
| *B60R 21/207* | (2006.01) |
| *B60R 21/233* | (2006.01) |
| *B60R 21/2338* | (2011.01) |
| *B60R 21/239* | (2006.01) |
| *B60R 21/26* | (2011.01) |

(52) U.S. Cl.
CPC ...... *B60R 21/23138* (2013.01); *B60R 21/207* (2013.01); *B60R 21/233* (2013.01); *B60R 21/239* (2013.01); *B60R 21/2338* (2013.01); *B60R 21/26* (2013.01); *B60R 2021/23146* (2013.01); *B60R 2021/23386* (2013.01)

(58) Field of Classification Search
CPC ............ B60R 21/23138; B60R 21/207; B60R 21/233; B60R 21/2338; B60R 21/239; B60R 21/26; B60R 2021/23146; B60R 2021/23386; B60R 2021/23161; B60R 21/231

See application file for complete search history.

(56) References Cited

U.S. PATENT DOCUMENTS 5,556,128 A * 9/1996 Sinnhuber ......... B60R 21/23138
280/730.2
6,231,069 B1 * 5/2001 Yokoyama ........ B60R 21/23138
280/730.2

(Continued)

FOREIGN PATENT DOCUMENTS

JP 2010115947 A 5/2010

*Primary Examiner* — Paul N Dickson
*Assistant Examiner* — Tiffany L Webb
(74) *Attorney, Agent, or Firm* — Harness, Dickey & Pierce, P.L.C.; Stephen T. Olson

(57) ABSTRACT

A far side side airbag device provided on the side part in the center in the width direction of a backrest portion of either of separated seats arranged in the width direction of a vehicle, which restrains the movement of an occupant. A cushion and an inflator expands and deploys the cushion. The cushion has a first portion and a second portion that expand and deploy onto the front surface of each of the adjacent separated seats when a signal is received to restrain the occupant and capture the side part of the occupant, and a center portion provided in between the first portion and the second portion. A protruding part is formed on the center portion in order to capture the head of the occupant.

16 Claims, 10 Drawing Sheets

(56) References Cited

U.S. PATENT DOCUMENTS

| | | | |
|---|---|---|---|
| 6,478,329 B1* | 11/2002 | Yokoyama | B60R 21/23138 |
| | | | 280/729 |
| 9,016,718 B2* | 4/2015 | Fukawatase | B60R 21/23138 |
| | | | 280/730.2 |
| 9,994,181 B1* | 6/2018 | Dubaisi | B60R 21/207 |
| 10,773,678 B2* | 9/2020 | Markusic | B60R 21/23138 |
| 10,843,652 B2* | 11/2020 | Byun | B60R 21/2334 |
| 2019/0061676 A1* | 2/2019 | Kwon | B60R 21/233 |
| 2019/0161053 A1* | 5/2019 | Gwon | B60N 2/64 |
| 2019/0283700 A1* | 9/2019 | Kwon | B60R 21/2338 |
| 2020/0317155 A1* | 10/2020 | Deng | B60R 21/233 |

* cited by examiner

[FIG. 1A]
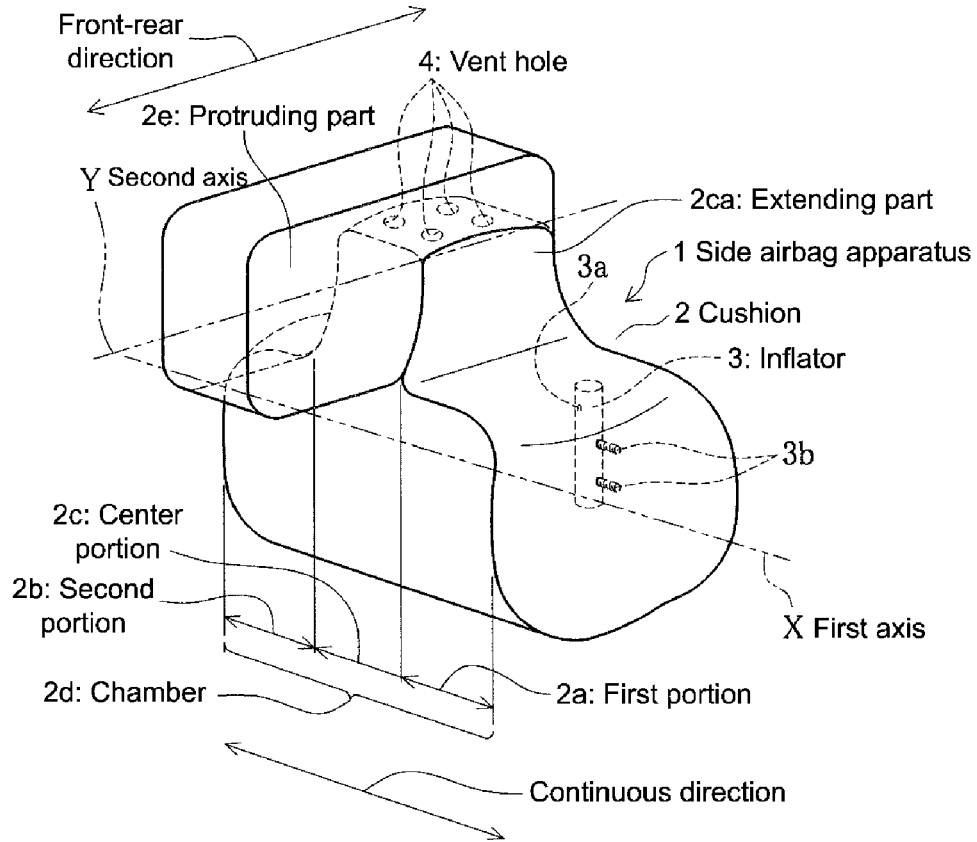
[FIG. 1B]
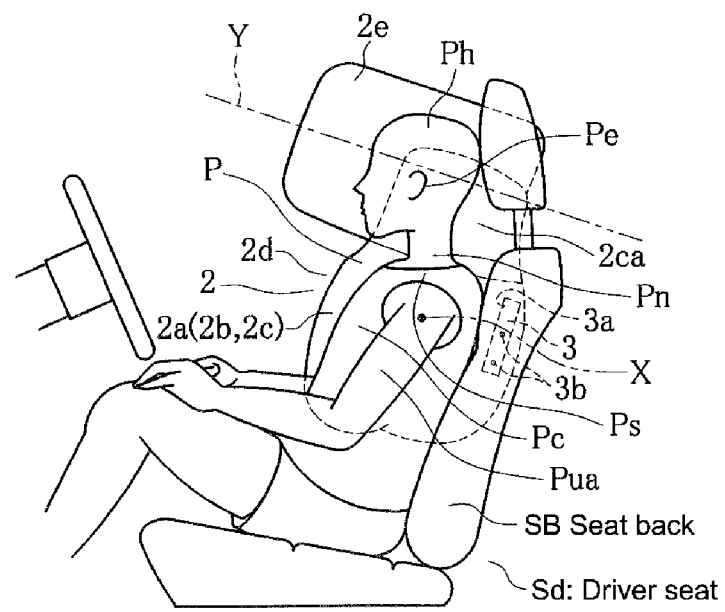

[FIG. 1C]
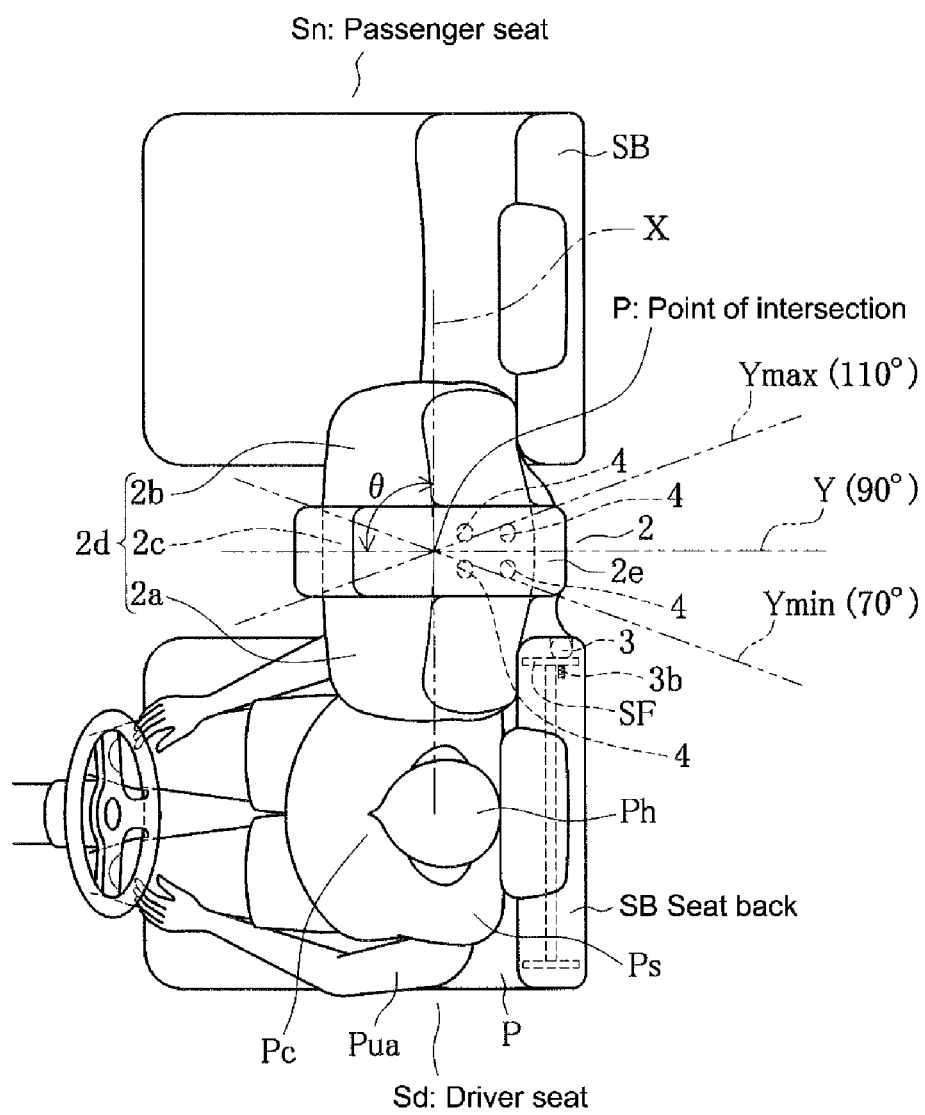

[FIG. 2A]
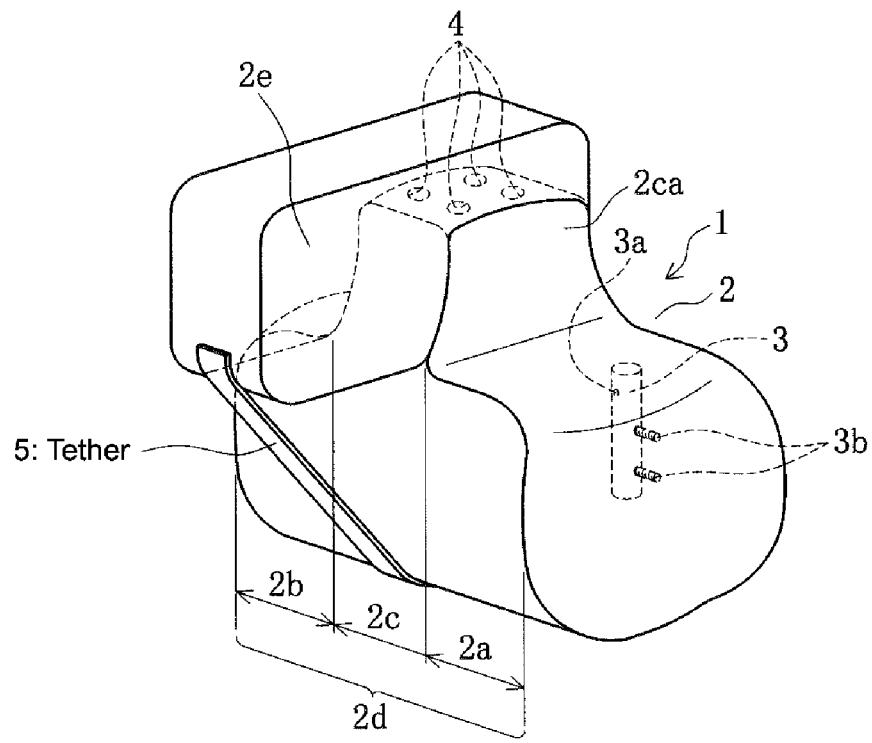
[FIG. 2B]
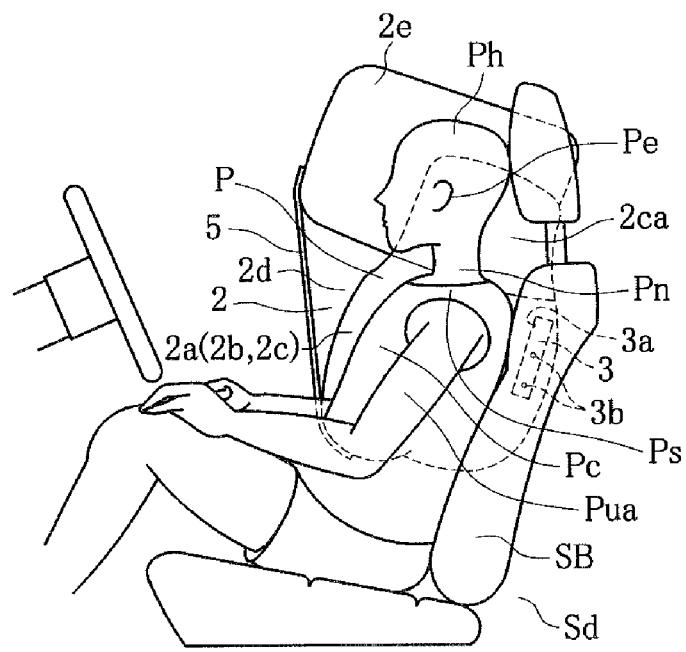

[FIG. 2C]
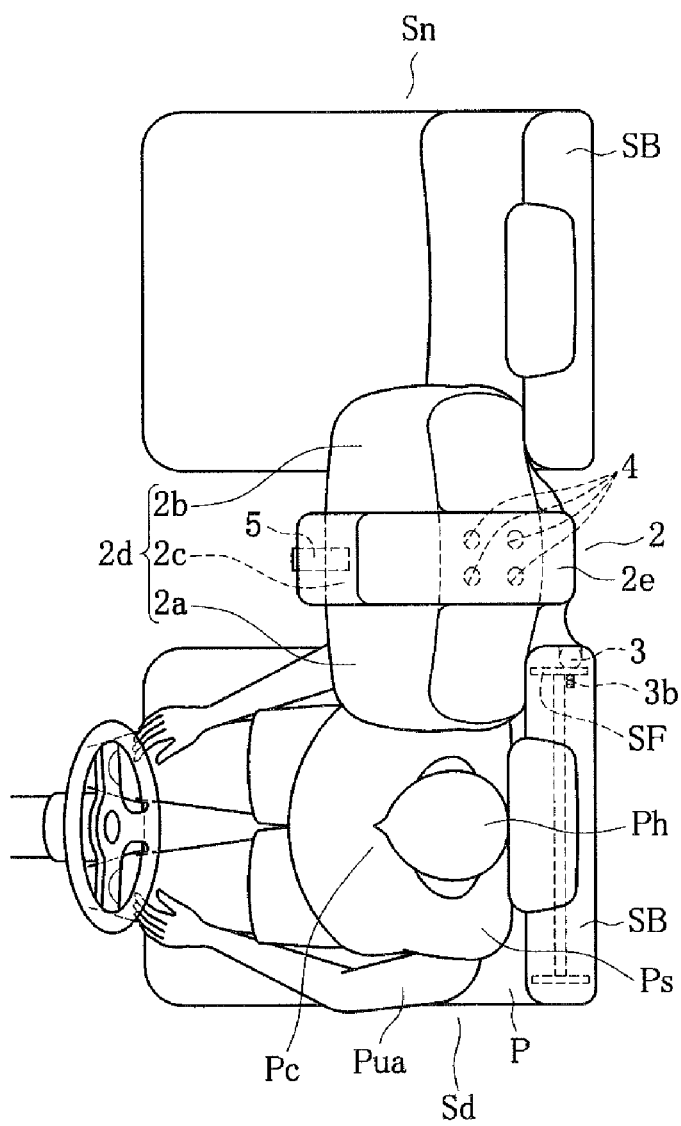

[FIG. 3A]
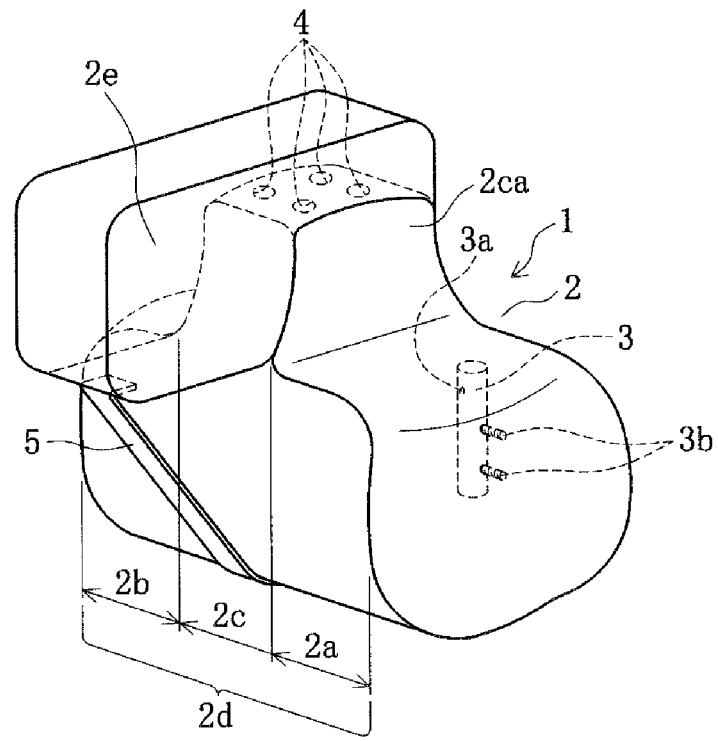
[FIG. 3B]
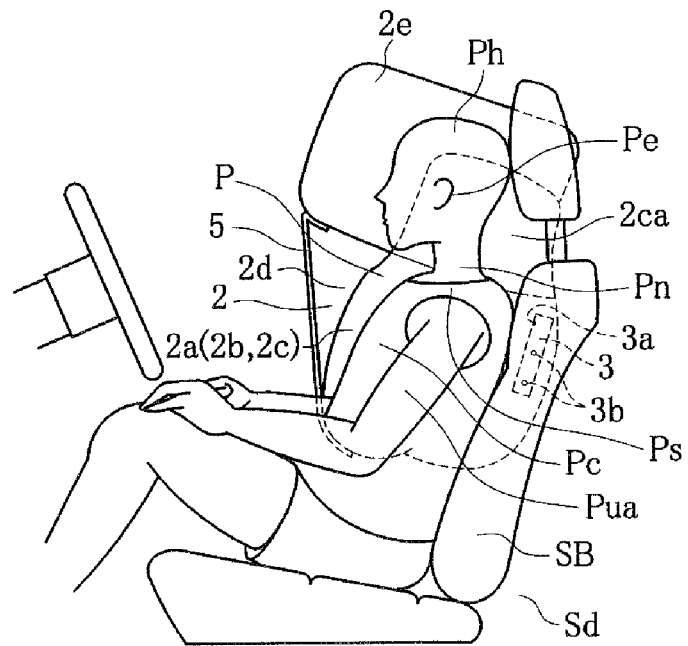

[FIG. 3C]
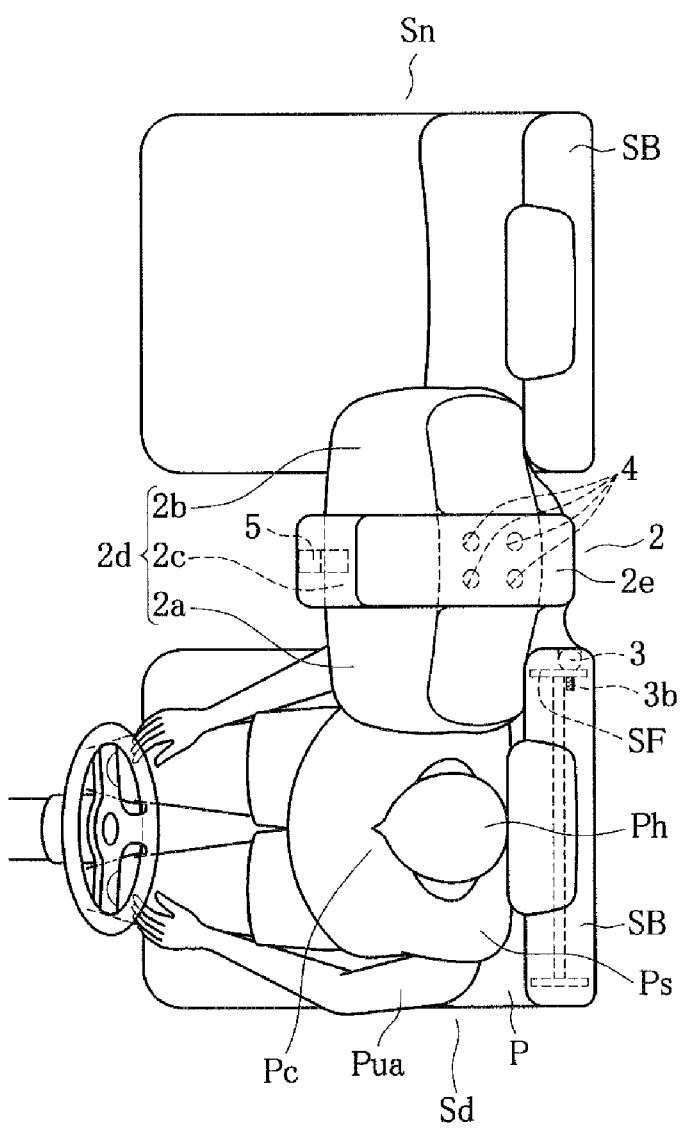

[FIG. 4]
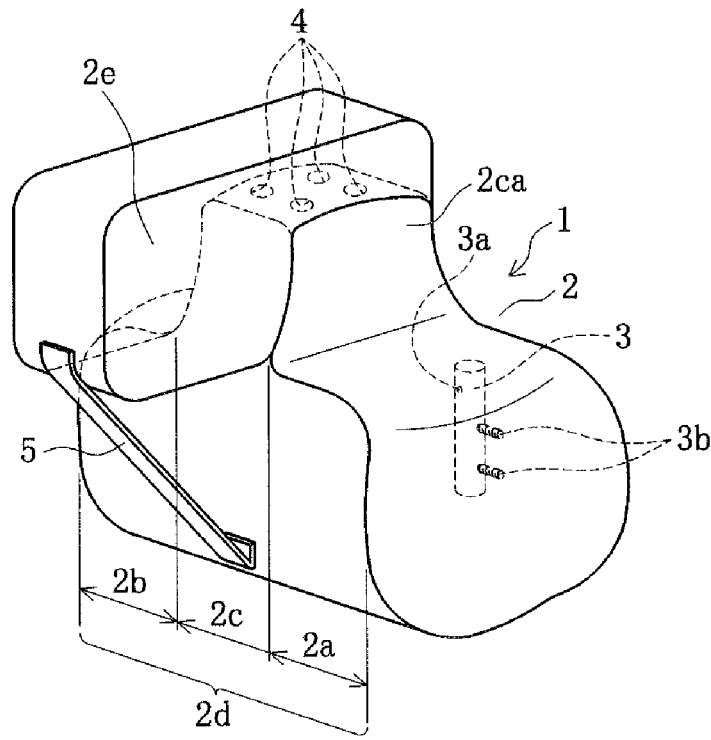
[FIG. 5]
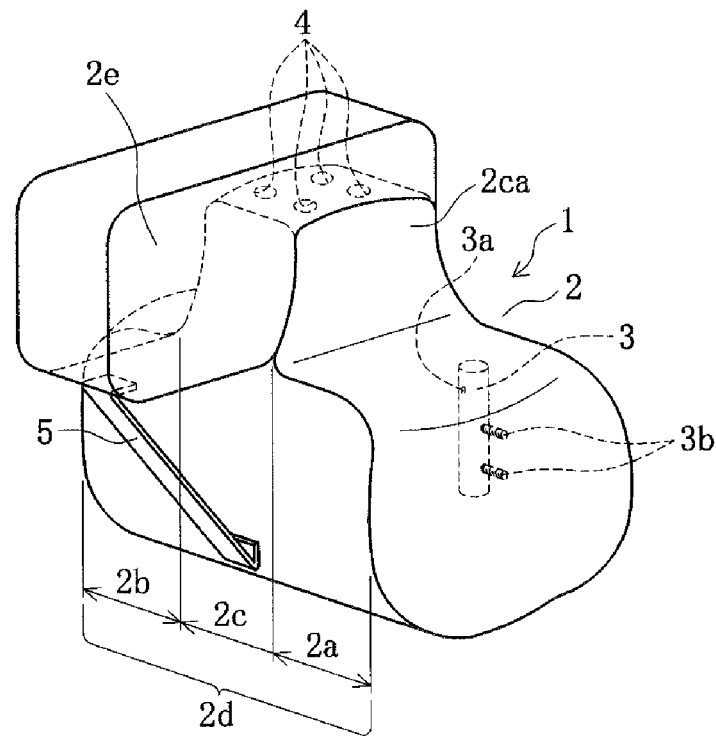

[FIG. 6]
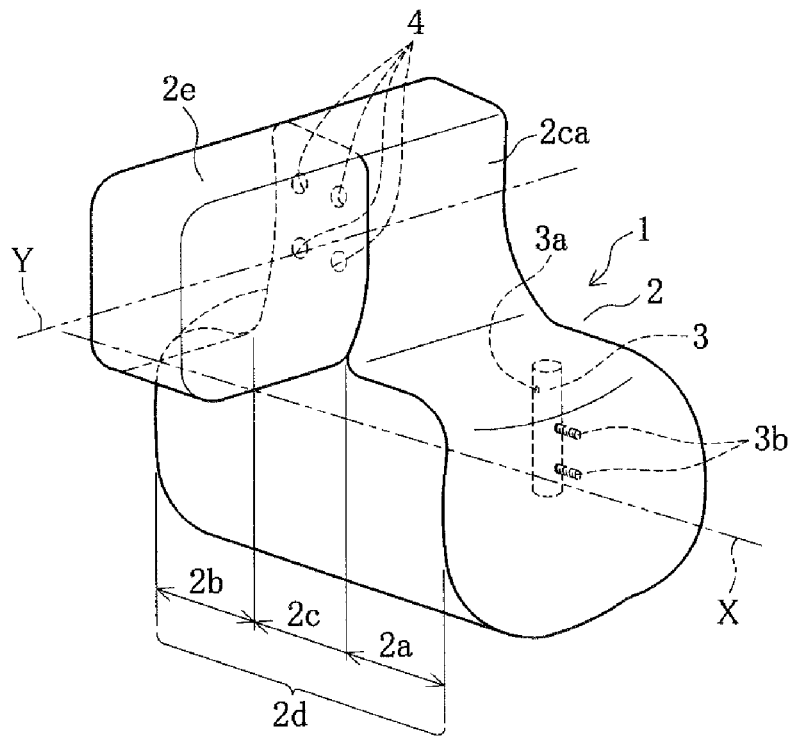
[FIG. 7]
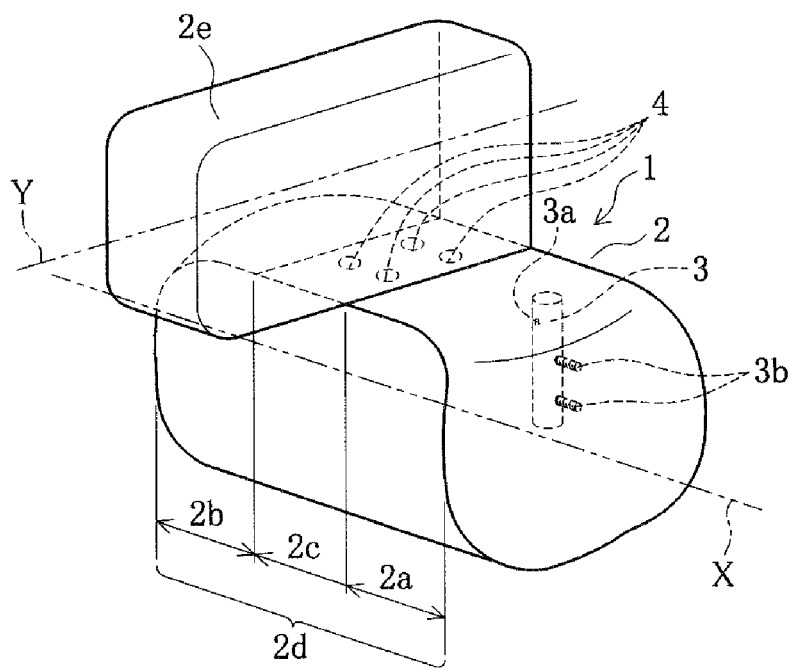

[FIG. 8A]
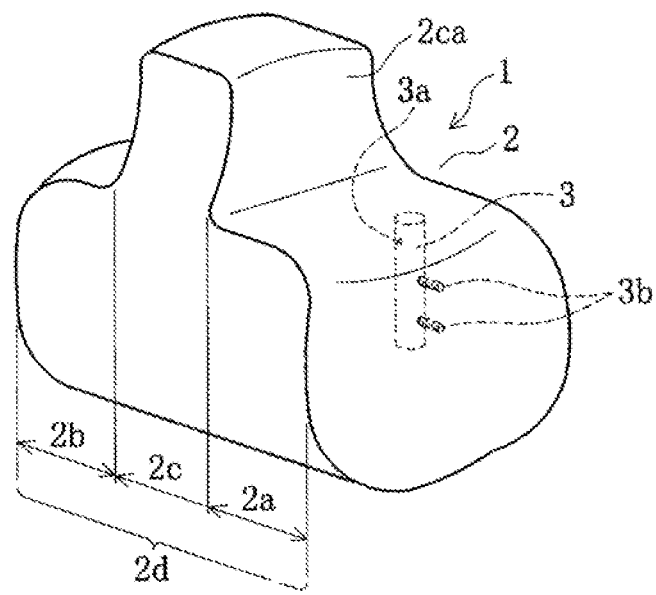
PRIOR ART
[FIG. 8B]
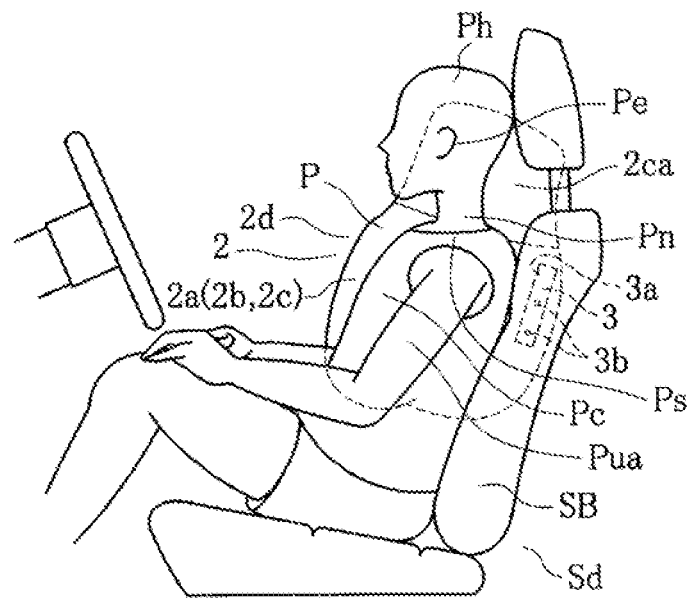
PRIOR ART

[FIG. 8C]
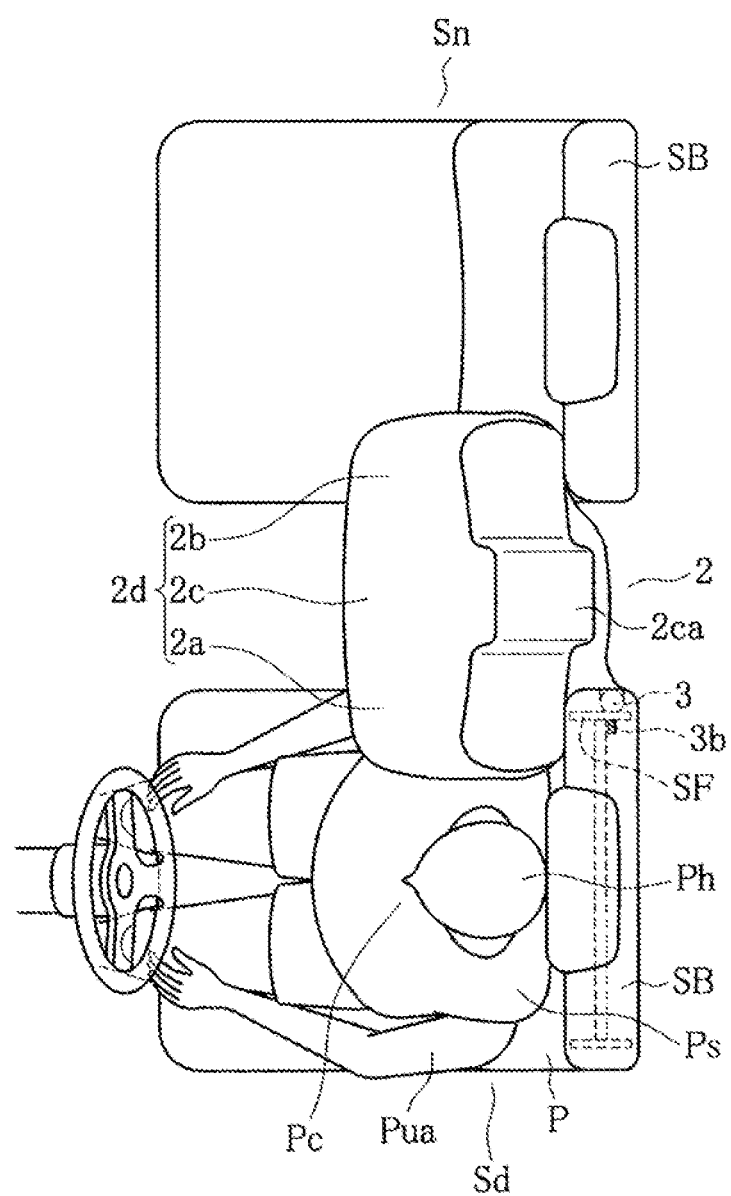
PRIOR ART

SIDE AIRBAG APPARATUS

TECHNICAL FIELD

The present invention relates to, for example, a side airbag apparatus which is provided in a vehicle to protect a passenger when the vehicle is impacted from the side (hereinafter, referred to as "upon a side collision"). In particular, the present invention relates to a side airbag device installed on the side on the center side in the width direction (hereinafter referred to as the far side) of either of the backrest portions of separated seats (hereinafter simply referred to as seats) provided side-by-side in a vehicle in the width direction of the vehicle.

As used in this application, "up" and "upper" refer to the head direction of an occupant seated in a normal position in the seat, and "down" and "lower" refer to the foot direction of the same occupant. In addition, "front" and "forward" refer to the frontward direction of an occupant seated in a normal position in the seat, and "rear" and "rearward" refer to the back direction of the same occupant. Moreover, "width direction" means the directions toward the left hand and right hand of an occupant seated in a normal position in the seat. Note that a "normal position" in the description above refers to a position along which the entire back of the occupant is in contact with the backrest of the seat at a center position in the width direction of the seat cushion that constitutes the seat.

BACKGROUND

A side airbag device that restrains movement of the occupant toward an impact location during a side collision, for example, is installed on the inner side portion of the backrest portion of the seat (hereinafter referred to as seat back).

This side airbag device is configured such that in the event of a side collision, a signal transmitted by a sensor that has detected an impact operates an inflator so as to generate gas, in order to deploy a cushion to the side of the occupant seated in the seat.

Patent Document 1 also discloses a far side side airbag device (the airbag device between seats of Patent Document 1), which is provided in a center console installed between the driver seat and the passenger seat, which are provided side-by-side in the width direction in a vehicle cabin.

The side airbag device disclosed in Patent Document 1 is configured of a cushion including a main bag that expands and deploys in the form of the letter I when viewed from the front, and a secondary bag in which gas is supplied through the main bag which protrudes towards the passenger seat side from the center in the vertical direction of the main bag when expanding and deploying.

The secondary bag is configured such that no gas is supplied, and does not expand and deploy while the internal pressure of the main bag is less than a prescribed value. In addition, when an occupant is determined to be seated in the passenger seat, only the main bag expands and deploys, and on the other hand, when an occupant is determined to not be seated in the passenger seat, the main bag and secondary bag both expand and deploy, restraining occupants seated in the driver seat and the passenger seat from moving toward the passenger seat side or the driver seat side, respectively.

RELATED ART DOCUMENTS

Patent Documents

Patent Document 1: JP 2010-115947 A

SUMMARY OF THE INVENTION

Problem to be Solved by the Invention

However, in the case of the side airbag device disclosed in Patent Document 1, the following inflator is necessary, for example, in place of the inflator of a typical side airbag device, and the following components are further required in addition to typical components of a side airbag device.

An output variable inflator that can switch between a first output where the internal pressure of the main bag is less than a prescribed value, and a second output in which the internal pressure of the main bag is equal to or greater than a prescribed value.

A detector for detecting the presence or absence of an occupant in the passenger seat.

A control device for switching the output of the inflator based on the detection result from the detector.

The problem addressed by the present invention is that, in the case of the side airbag device on the far side disclosed in Patent Document 1, for example, a detector that detects the presence or absence of an occupant in the passenger seat, and a control device that switches the output of the inflator are required.

An object of the present invention is to allow a configuration of a far side side airbag device for restraining movement of an occupant, seated in a seat installed side-by-side in a vehicle in the width direction of the vehicle, towards the part of the vehicle that was impacted in the event of a collision, using only common components. Herein, an object of the present invention is to effectively suppress movement of the head of the occupant seated in the seat and movement of the occupant obliquely forward.

Means for Solving the Problem

The present invention is a side airbag device for protecting an occupant by restraining movement of the occupant toward the location where impact is applied in the event of a collision, and is provided on the far side of the seat back of one seat of the seats arranged side-by-side in the width direction of a vehicle in the vehicle cabin.

The side airbag device of the present invention is composed of a cushion and an inflator provided on the inner portion of the cushion that produces gas after a signal is received from a sensor, which expands and deploys the cushion.

The cushion includes a first portion and a second portion that expand and deploy when a signal is received in a state of expanding onto the front surface of the adjacent seat and other seat, and a center portion provided between the first portion and the second portion in order to capture the side part of the occupant and restrain movement of the occupant.

A main feature of the present invention is that a protruding part that protrudes beyond the first part and second part at least in the forward direction of the vehicle is formed on the center portion enabling capturing and stopping movement of the occupant's head as well as oblique forward movement when the cushion expands and deploys.

The present invention does not require special components such as, for example, an output variable inflator, a detector that detects the presence or absence of an occupant in the passenger seat, or a control device that switches the output of the inflator. In addition, the protruding part formed on the center portion can effectively restrain movement of the head of the occupant seated in the seat as well as oblique forward movement of the occupant.

In addition, for the present invention, the center portion is preferably provided in such a way that the following conditions are met, for a chamber in which the first portion, center portion, and second portion are continuously and integrally formed.

Conditions:
A first axis that extends from the centroid of the cross-section at the center part in the continuous direction of the first portion, center portion, and second portion, in a direction orthogonal to the cross-section and a second axis extending from the centroid of the cross-section of the center portion in the front-rear direction of the protruding part in a direction orthogonal to the cross-section intersect at a prescribed angle when the first axis and second axis are viewed in a plan view from above the vehicle.

In the case described above, the first axis and the second axis preferably intersect in a range of 90°±20° when viewed in a plan view. If the angle between the first axis and the second axis is within this range, the protruding part can sufficiently protect the head of the occupant even when the head moves comparatively forward, such as during an oblique collision or offset collision.

With the present invention, the protruding part of the cushion is formed as follows, depending on whether or not the protruding part has an upward extending part in the center portion of the cushion, and depending on the top surface position of this extending part.

If the center portion of the cushion has an upward extending part, and the upper surface of the extending part is the same as or above the crown of the head of the occupant seated in the seat:
The protruding part of the cushion is formed on the front surface of the extending part of the center portion, protruding in the forward direction from the extending part.

If the center portion of the cushion has an upward extending part, and the upper surface of the extending part is below the crown of the head of the occupant seated in the seat:
The protruding part of the cushion is formed to cover the top surface of the center portion of the cushion such that the top surface is above the crown of the head of the occupant seated in the seat on this covered portion and the front surface of the extending part so as to protrude in the forward direction from this front surface.

If the center portion of the cushion does not have an upward extending part: The protruding part of the cushion is formed to cover the top surface of the center portion of the cushion such that the top surface is above the crown of the head of the occupant seated in the seat, where the covered portion protrudes in the forward direction from the front surface of the center portion.

In any event, the top surface of the extending part of the cushion or the highest portion of the top surface of the protruding part is positioned above the crown of the head of the occupant, and the protruding part preferably extends from the upper portion of the extending part or from the front side toward the forward direction of the vehicle.

In addition, in the present invention, the first portion, the second portion, and the center portion of the cushion are preferably formed as one chamber, and the protruding part is formed as a different chamber separated from this chamber. Thus, a time lag can be added between the expansion and deployment of the chamber of the cushion and the expansion and deployment of the protruding part formed in a different chamber than this chamber. This allows for early restraint of the shoulders and other parts of the occupant, which is necessary at the time of initial restraint, as well as adequate head protection due to movement of the occupant in the latter half of the collision.

A time lag between the expansion and deployment of the chamber of the cushion and the expansion and deployment of the protruding part formed in a different chamber than that chamber can be achieved by connecting that chamber and the protruding part via a vent hole. For example, the chamber can be provided with an inflator and the vent hole can be made large enough to allow gas to flow into the protruding part after the expansion and deployment of the chamber starts.

In the present invention, a tether can be provided to connect between the front surface lower portion or bottom surface forward portion of the protruding part and the front surface lower portion or the bottom surface forward portion of the center portion. If such a tether is provided, the position of the protruding part can be effectively maintained to capture the head of the occupant more reliably and to achieve restraining force on the occupant during a collision.

Effect of the Invention

According to the present invention, by forming a protruding part in the center portion of the cushion, movement of the head of the occupant seated in the seat and movement of the occupant obliquely forward can be effectively restrained with just common components without the need for special components.

Connecting the protruding part and the center portion together by a tether enables capturing the head of the occupant more reliably, as well as achieving restraining force on the occupant during a collision.

BRIEF DESCRIPTION OF THE DRAWINGS

FIG. 1A is a diagram illustrating embodiment 1 of the cushion making up the side airbag device of the present invention, and is a perspective view illustrating the expanded and deployed state thereof.

FIG. 1B is a diagram of the side airbag device of the present invention provided with the cushion as illustrated in FIG. 1A, with the cushion expanded and deployed, as seen from the side of the vehicle.

FIG. 1C is a diagram of the side airbag device of the present invention provided with the cushion as illustrated in FIG. 1A, with the cushion expanded and deployed, as seen from above the vehicle.

FIG. 2A is a diagram similar to FIG. 1A, illustrating a first variant of embodiment 1 of the cushion making up the side airbag device of the present invention.

FIG. 2B is a diagram similar to FIG. 1B of the side airbag device of the present invention provided with the cushion as illustrated in FIG. 2A.

FIG. 2C is a diagram similar to FIG. 1C of the side airbag device of the present invention provided with the cushion as illustrated in FIG. 2A.

FIG. 3A is a diagram similar to FIG. 1A, illustrating a second variant of embodiment 1 of the cushion making up the side airbag device of the present invention.

FIG. 3B is a diagram similar to FIG. 1B of the side airbag device of the present invention provided with the cushion as illustrated in FIG. 3A.

FIG. 3C is a diagram similar to FIG. 1C of the side airbag device of the present invention provided with the cushion as illustrated in FIG. 3A.

FIG. 4 is a diagram similar to FIG. 1A, illustrating a third variant of embodiment 1 of the cushion making up the side airbag device of the present invention.

FIG. 5 is a diagram similar to FIG. 1A, illustrating a fourth variant of embodiment 1 of the cushion making up the side airbag device of the present invention.

FIG. 6 is a diagram similar to FIG. 1A, illustrating embodiment 2 of the cushion making up the side airbag device of the present invention.

FIG. 7 is a diagram similar to FIG. 1A, illustrating embodiment 3 of the cushion making up the side airbag device of the present invention.

FIG. 8A is a diagram similar to FIG. 1A, illustrating the cushion of a side airbag device without the configuration of the present invention.

FIG. 8B is a diagram similar to FIG. 1B, illustrating a side airbag device provided with the cushion as illustrated in FIG. 8A.

FIG. 8C is a diagram similar to FIG. 1C, illustrating the side airbag device provided with the cushion as illustrated in FIG. 8A.

PREFERRED EMBODIMENT OF THE INVENTION

An object of the present invention is to enable configuration of a far side side airbag device that restrains movement of an occupant seated in a seat installed side-by-side in a vehicle in the width direction of the vehicle at the time of a collision from the side of the vehicle or from an oblique direction and absorbs the impact, using only common components. Furthermore, in doing so, an object of the present invention is to effectively restrain movement of the head of the occupant as well as oblique forward movement of the occupant.

The present invention achieves the objective through the forming of a protruding part on the center portion provided between the first portion and second portion that expand and deploy up onto the front surfaces of a first seat and a second seat that are adjacent to each other that protrudes in the forward direction of the vehicle at least more than the first part and second part.

An embodiment of the present invention is described below using the attached diagrams. Note that the explanations of the embodiments below are examples of the present invention, and are not intended to limit the scope of the present invention, the application, and the uses thereof.

Embodiment 1

FIG. 1A to FIG. 1C are diagrams illustrating embodiment 1 of the side airbag device of the present invention. Embodiment 1 will be explained below in comparison to the side airbag device as illustrated in FIG. 8A to FIG. 8C, which does not have the features of the present invention.

The side airbag device 1 shown in FIG. 1A to FIG. 1C and FIG. 8A to FIG. 8C is installed inside the far side of a seat back SB of any one of the seats, for example, the driver seat Sd and the passenger seat Sn, which are arranged side-by-side in a vehicle in the width direction of the vehicle.

The side airbag device 1 is arranged with an inflator 3, with a cylindrical shape for example, inside a cushion 2, which receives a signal from a sensor and ejects gas through a hole 3a provided on the exterior surface thereof into the interior of the cushion 2.

The cushion 2 is attached to a side frame SF inside the seat back SB using two stud bolts 3b provided in a protruding manner at appropriate intervals in the longitudinal direction of the exterior surface of the inflator 3 opposite the hole 3a.

The cushion 2 includes a first portion 2a and a second portion 2b that expand and deploy in a manner expanding up onto the front surface of the driver seat Sd and the passenger seat Sn, and a center portion 2c that expands and deploys between the first portion 2a and the second portion 2b. Note that the boundaries of the first portion 2a, the second portion 2b, and the center portion 2c are not precise.

Regarding the side airbag device 1 illustrated in FIG. 1A to FIG. 1C and FIG. 8A to FIG. 8C, the first portion 2a, the second portion 2b, and the center portion 2c are integrally formed in one chamber 2d. When viewed from the front side of the vehicle, the chamber 2d is formed by joining a suitable number of base material panels such that the extending part 2ca extending above the first portion 2a and the second portion 2b has the necessary thickness in the front-rear direction of the vehicle.

The first portion 2a and the second portion 2b have a length in the vertical direction and the front-rear direction that can capture the side parts of the torso of an occupant P, for example, the shoulder Ps, the chest Pc, and the upper arm portion Pua. In addition, the center portion 2c has a length in the vertical direction and in the front-rear direction that is able to capture the side part of the occupant P, and due to the extending part 2ca thereof, can capture, for example, the rear side of a head Ph of the occupant P, from a neck Pn to an ear Pe.

Regarding the side airbag device 1, during a side collision, an oblique collision, an offset collision, or the like, the inflator 3, which receives a signal from the sensor, ejects gas from the hole 3a provided on the exterior thereof into the chamber 2d, and expands and deploys the chamber 2d.

Therefore, during a side collision or the like, the first portion 2a and the second portion 2b that are expanded and deployed and expand and deploy up onto the front surface of the driver seat Sd and the passenger seat Sn capture movement of, for example, the shoulder Ps, the chest Pc, and the upper arm Pua of the occupant P due to a collision, and restrain movement of the occupant P.

In the case of the side airbag device 1, the extending part 2ca of the center portion 2c captures the head Ph of the occupant P. However, there is demand for further performance improvement such that the entire head Ph of the occupant P can be more reliably captured starting with the initial stages of a vehicle collision through the end of the vehicle collision when the effects of the collision are no longer present.

Therefore, in the present embodiment, a protruding part 2e formed on the center portion 2c of the cushion 2 that protrudes further in the front direction of the vehicle than the first portion 2a and second portion 2b upon expansion and deployment enables capturing the entire head Ph of the occupant P. The protruding part 2e also serves to capture oblique forward movement of the occupant P in the event of a collision from an oblique direction or the like.

In embodiment 1 as illustrated in FIG. 1A to FIG. 1C, the protruding part 2e is provided covering the top surface of the extending part 2ca such that the top surface of the protruding part 2e is above the crown of the head of the occupant P seated in the driver seat Sd or the passenger seat Sn. Furthermore, forming is done with a suitable number of base material panels to be shaped in a manner protruding in the forward direction from the front surface of this covered portion and the extending part 2ca. This protruding part 2e is formed in another chamber separate from the chamber 2d and is joined with the chamber 2d via a vent hole 4 provided on the top surface of the extending part 2ca.

In addition, in the present embodiment, the protruding part 2e is preferably provided as follows with respect to the chamber 2d in which the first portion 2a, the center portion 2c, and the second portion 2b are continuously and integrally formed.

First, the first axis and second axis are defined in order to determine the orientation of the chamber 2d and protruding part 2e. The first axis X, as indicated with an imaginary line in FIG. 1A, is the axis that extends in a direction orthogonal to the cross-section from the centroid of the cross-section at the center part in the continuous direction of the first portion 2a, center portion 2c, and second portion 2b of the chamber 2d (in other words, the longitudinal direction of the chamber 2d). In addition, the second axis Y, also indicated by a dashed line, is the axis extending in a direction orthogonal in the cross-section plane from the cross section centroid of the center portion in the front-rear direction of the vehicle of the protruding part 2e. Note that the centroid is a geometric center of gravity that is determined with respect to the contour shape of each of the cross sections.

When a plan view of the first axis X and the second axis Y defined as described above are viewed from above the vehicle as illustrated in FIG. 1C, a point of intersection P where the first axis X and the second axis Y intersect can be defined. With the present invention, the protruding part 2e is preferably provided such that the angle θ formed by the first axis X and the second axis Y that extend from the point of intersection P is in the range of 90°±20°.

Note that embodiment 1 is an example of a case in which the first axis X and the second axis Y are orthogonal at 90°. In embodiment 1, for example, when the first axis X is fixed and the preferred range of the second axis Y is illustrated, FIG. 1C indicates a range of Ymin (70°) and Ymax (110°). When the protruding part 2e is provided such that the first axis X and the second axis Y are in a range of not less than 70° and not greater than 110°, even in the case of, for example, an oblique collision or an offset collision, the protruding part 2e can capture the head Ph of the occupant P that moves comparatively forward, sufficiently protecting the occupant P.

The inner diameter of the vent hole 4 is sized such that gas flows into the protruding part 2e in the latter half of expansion and deployment of the chamber 2d, and a time lag is generated between expansion and deployment of the chamber 2d and expansion deployment of the protruding part 2e.

In the side airbag device 1 according to the present invention in which the protruding part 2e is provided on the extending part 2ca, the inflator 3, which receives a signal from the sensor in the event of a side collision, ejects gas into the chamber 2d from the hole 3a provided on the exterior of the inflator 3, and expands and deploys the chamber 2d.

Furthermore, after the chamber 2d has expanded and deployed to some extent, gas flows from the vent hole 4 into the protruding part 2e, and the protruding part 2e expands and deploys. This expanded protruding portion 2e can reliably capture the entirety of the occupant P and the head Ph thereof, which is moved by an impact, not only when the impact is applied from the side of the occupant P, but also when an oblique forward impact is applied to the occupant P.

First Variant of Embodiment 1

FIG. 2A to FIG. 2C are diagrams illustrating the first variant of embodiment 1 of the side airbag device of the present invention.

In this first variant, the front surface lower portion of the protruding part 2e and the bottom surface forward portion of the center portion 2c of the first embodiment illustrated in FIG. 1A to FIG. 1C are connected with a tether 5, with the remaining structure the same as embodiment 1.

In this first variant, because the protruding part 2e and the center portion 2c are connected by the tether 5, movement of the head Ph of the occupant P can be effectively restrained even in a case where the head Ph moves and collides with the portion of the protruding part 2e that expands and deploys in the forward direction of the extending part 2ca of the protruding part 2e.

Second Variant of Embodiment 1

FIG. 3A to FIG. 3C are diagrams illustrating the second variant of embodiment 1 of the side airbag device according to the present invention.

In this second variant, the attachment position of the tether 5 of the first variant illustrated in FIG. 2A to FIG. 2C is changed from the front surface lower portion to the bottom surface forward portion, and also exhibits the same effects as the first variant.

Third Variant of Embodiment 1

FIG. 4 is a diagram illustrating the third variant of embodiment 1 of the side airbag device according to the present invention.

In this third variant, the attachment position of the tether 5 of the first variant illustrated in FIG. 2A to FIG. 2C to the center portion 2c is changed from the bottom surface forward portion to the front surface lower portion, and also exhibits the same effects as the first variant.

Fourth Variant of Embodiment 1

FIG. 5 is a diagram illustrating the fourth variant of embodiment 1 of the side airbag device according to the present invention.

In this fourth variant, the attachment position of the tether 5 of the second variant illustrated in FIG. 3A to FIG. 3C to the center portion 2c is changed from the bottom surface forward portion to the front surface lower portion, and also exhibits the same effects as the first variant.

Embodiment 2

FIG. 6 is a diagram illustrating embodiment 2 of the side airbag device according to the present invention.

In embodiment 2, the top surface position of the extending part 2ca of the center portion 2c of the side airbag device 1 illustrated in FIG. 8A to FIG. 8C is at the same height or above the top of the head Ph of the occupant P.

When the side airbag device 1 has an extending part 2ca at the top surface position in this manner, the entirety of the protruding part 2e is provided on the front surface of the extending part 2ca, and the vent hole 4 that connects the protruding part 2e and the chamber 2d is formed on the front surface of the extending part 2ca. In a similar manner as embodiment 1 as illustrated in FIG. 1A to FIG. 1C, first axis X and second axis Y can be defined for this embodiment 2 and accomplish the same effects as in embodiment 1.

In addition, as with the first through fourth variants of embodiment 1, in embodiment 2, when the protruding part 2e and the center portion 2c are connected by the tether 5, the same effects as the first through fourth variants of embodiment 1 are accomplished.

Embodiment 3

FIG. 7 is a diagram illustrating embodiment 3 of the side airbag device according to the present invention. This embodiment 3 is an example in which there is no extending part 2ca on the center portion 2c of the side airbag device 1 illustrated in FIG. 8A to FIG. 8C, or in other words, the top surface position of the center portion 2c is the same as the top surface position of the first portion 2a and the second portion 2b.

When the side airbag device 1 has a center portion 2c without such an extending part 2ca, the protruding part 2e is provided covering the top surface of the center portion 2c such that the top surface of the protruding part 2e is above the top of the crown of the head of an occupant P seated in the driver seat Sd or the passenger seat Sn. The covered portion then protrudes in the forward direction from the front surface of the center portion 2c. Here, the vent hole 4 that connects the protruding part 2e and the chamber 2d is formed on the top surface of the center portion 2c. In a similar manner as embodiment 1 as illustrated in FIG. 1A to FIG. 1C, first axis X and second axis Y can be defined for this embodiment 3 and accomplish the same effects as in embodiment 1.

In addition, as with the first through fourth variants of embodiment 1, in embodiment 3, when the protruding part 2e and the center portion 2c are connected by the tether 5, the same effects as the first through fourth variants of embodiment 1 are accomplished.

Needless to say, while the present invention is not limited to the abovementioned examples, the embodiments may be appropriately changed within the scope of the technical ideas described in each claim.

That is, the abovementioned side airbag apparatus is a preferred example of the present invention and includes embodiments other than this example. Unless particularly limited in the specification of the present application, the shape, size, and configuration, arrangement, etc. of the detailed parts illustrated in the appended drawings in the present invention are not restricted. Moreover, the expressions and terms used in the specification of the present application are for the purpose of description and are not limited thereto unless specifically limited.

For example, in the first embodiment, the vent hole 4 is provided only on the top surface of the extending part 2ca, however, the vent hole 4 can also be provided on the front surface in addition to the upper surface of the extending part 2ca. Alternatively, the vent hole 4 can also be provided only on the front surface of the extending part 2ca.

In addition, the joining of the cushion 2 and the tether 5 can be performed in any manner such as sewing, bonding, welding, or the like, provided that a prescribed strength is obtained.

Furthermore, the embodiments above indicate that the first portion 2a and second portion 2b of the cushion 2, the center portion 2c, and the extending part 2ca of the center portion 2c are formed in one chamber 2d. However, a plurality of chambers can be formed, as long as expansion and deployment can be achieved without any time lag, such as by sending the gas from the inflator 3 directly into the respective portions 2a to 2c, 2ca.

In addition, the cushion 2 of the present invention is not limited to being joined by a suitable number of sewn base material panels, and can also be formed by using a technology called one-piece weaving.

Moreover, in the above embodiments, the side airbag device 1 of the present invention is stored in the far side side part of the driver seat Sd, but can also be stored in the far side side part of the passenger seat Sn.

For a vehicle provided with three rows of seats in the front-rear direction and the seats in the second row arranged side-by-side vehicle in the width direction of the vehicle, the side airbag device 1 of the present invention can be attached to the seats in the second row.

EXPLANATION OF CODES

1 Side airbag apparatus
2: Cushion
2a: First portion
2b: Second portion
2c: Center portion
2ca: Extending part
2d: Chamber
2e: Protruding part
3: Inflator
4: Vent hole
5: Tether
Sd: Driver's seat
Sn: Passenger seat
SB Seat back
P Passenger
Ps: Shoulder
Pua: Upper arm
Pc: Chest
Ph: Head
X: First axis
Y: Second axis

The invention claimed is:

1. A side airbag device for deployment from a lateral side of a first seat of a vehicle between the first seat and a second seat of the vehicle, the side airbag device comprising:
a cushion inflatable from gas provided by an inflator to expand and deploy the cushion after receiving a signal from a sensor, the cushion including a first portion, a second portion and a center portion laterally between the first and second portions, the cushion further including a protruding part formed on the center portion that extends farther in a forward direction than the first portion and the second portion when the cushion is deployed, the center portion of the cushion including an extending part the extends upwards above the first portion and the second portion, the protruding part covering a front surface of the extending part and protruding in the forward direction from the front surface.

2. The side airbag device according to claim 1, wherein cushion includes a chamber integrally formed to include the first portion, center portion, and the second portion.

3. The side airbag device according to claim 1, wherein the protruding part is formed on the front surface of the extending part to protrude in the forward direction from the extending part.

4. The side airbag device according to claim 3, further comprising a tether connecting the protruding part with the center portion.

5. The side airbag device according to claim 1, wherein the first portion, the second portion, and the center portion are formed in one chamber, and the protruding part is formed in a different chamber separated from the first portion, second portion, and center portion.

6. The side airbag device according to claim 5, wherein the chamber and the protruding part formed in a different chamber are connected via a vent hole.

7. The side airbag device according to claim 6, the vent hole allows gas to flow into the protruding part after initial expansion and deployment of the chamber.

8. The side airbag device according to claim 5, further comprising a tether connecting the protruding part with the center portion.

9. The side airbag device according to claim 1, further comprising a tether connecting the protruding part with the center portion.

10. A side airbag device for deployment from a lateral side of a first seat of a vehicle between the first seat and a second seat of the vehicle, the side airbag device comprising:
   a cushion inflatable from gas provided by an inflator to expand and deploy the cushion after receiving a signal from a sensor, the cushion including a first portion, a second portion and a center portion laterally between the first and second portions, the cushion further including a protruding part formed on the center portion that extends farther in a forward direction than the first portion and the second portion when the cushion is deployed, wherein the protruding part is formed to cover a top surface of the center portion, and the protruding part protrudes in a forward direction farther than the the center portion.

11. The side airbag device according to claim 10, wherein the first portion, the second portion, and the center portion are formed in one chamber, and the protruding part is formed in a different chamber separated from the first portion, second portion, and center portion.

12. The side airbag device according to claim 10, further comprising a tether connecting the protruding part with the center portion.

13. A side airbag device for deployment from a lateral side of a first seat of a vehicle between the first seat and a second seat of the vehicle, the side airbag device comprising:
   a cushion inflatable from gas provided by an inflator to expand and deploy the cushion after receiving a signal from a sensor, the cushion including a first portion, a second portion and a center portion laterally between the first and second portions, the cushion further including a protruding part formed on the center portion that extends farther in a forward direction than the first portion and the second portion when the cushion is deployed, the cushion further including an extending part the extends upwards above the first portion and the second portion form the center portion, the protruding part is formed on a front surface of the extending part to protrude in the forward direction from the extending part,
   wherein the first portion, the second portion, and the center portion are formed in one chamber, and the protruding part is formed in a different chamber separated from the first portion, second portion, and center portion.

14. The side airbag device according to claim 13, wherein the chamber and the protruding part formed in a different chamber are joined together via a vent hole.

15. The side airbag device according to claim 14, wherein the vent hole allows gas to flow into the protruding part after initial expansion and deployment of the chamber.

16. The side airbag device according to claim 14, further comprising a tether connecting the protruding part with the center portion.

* * * * *